US011474254B2

(12) United States Patent
Kotelova et al.

(10) Patent No.: US 11,474,254 B2
(45) Date of Patent: Oct. 18, 2022

(54) MULTI-AXES SCANNING SYSTEM FROM SINGLE-AXIS SCANNER

(71) Applicant: Piaggio Fast Forward, Inc., Boston, MA (US)

(72) Inventors: Rossitza D. Kotelova, Cambridge, MA (US); Kevin Shadle, Somerville, MA (US)

(73) Assignee: Piaggio Fast Forward Inc., Boston, MA (US)

( * ) Notice: Subject to any disclaimer, the term of this patent is extended or adjusted under 35 U.S.C. 154(b) by 999 days.

(21) Appl. No.: 16/183,198

(22) Filed: Nov. 7, 2018

(65) Prior Publication Data

US 2019/0137629 A1  May 9, 2019

Related U.S. Application Data

(60) Provisional application No. 62/582,760, filed on Nov. 7, 2017.

(51) Int. Cl.
*G01S 17/931* (2020.01)
*G02B 26/12* (2006.01)
(Continued)

(52) U.S. Cl.
CPC .......... *G01S 17/931* (2020.01); *G01S 7/4817* (2013.01); *G01S 17/42* (2013.01); *G02B 26/12* (2013.01); *G05D 1/00* (2013.01)

(58) Field of Classification Search
CPC ...... G01S 17/931; G01S 7/4817; G01S 17/42; G02B 26/12; G05D 1/00
See application file for complete search history.

(56) References Cited

U.S. PATENT DOCUMENTS

D203,597 S   2/1966  Newton
D217,153 S   4/1970  Adkins et al.
(Continued)

FOREIGN PATENT DOCUMENTS

CN   102938978   2/2013
DE   19757848    7/1999
(Continued)

OTHER PUBLICATIONS

Burch, Carol, and Kris Vasoya. "Carbon Composite for Tough PCB Design Specifications" OnBoard Technology, Oct. 2006.
(Continued)

*Primary Examiner* — Luke D Ratcliffe
(74) *Attorney, Agent, or Firm* — Sunstein LLP (57) ABSTRACT

Provided are a multi-axis scanning system and method that utilize a single scanner. The scanner radially projects an output beam in a first angular plane over a range of scan angles. At least one reflector is fixed relative to the scanner to receive the output beam in at least one portion of the range of scan angles and redirects the received output beam in at least one other angular plane extending at least partially beneath the first angular plane. The first angular plane can be substantially parallel to a ground surface and the at least one other angular plane can include a plane that extends from the reflective surface to the ground surface. The scanner can be configured to detect a reflection of the output beam, to determine a distance to an object reflecting an incident output beam.

22 Claims, 6 Drawing Sheets

(51) Int. Cl.
  *G01S 17/42* (2006.01)
  *G01S 7/481* (2006.01)
  *G05D 1/00* (2006.01)

(56) References Cited

U.S. PATENT DOCUMENTS

| | | | |
|---|---|---|---|
| 4,127,771 | A | 11/1978 | Sick |
| 4,477,184 | A | 10/1984 | Endo |
| H650 | H | 7/1989 | Lindenmeyer |
| 4,864,121 | A | 9/1989 | Pietzsch |
| 4,875,761 | A | 10/1989 | Fetzer |
| 4,942,529 | A | 7/1990 | Avitan et al. |
| D339,149 | S | 9/1993 | Nakamura et al. |
| D364,840 | S | 12/1995 | Oshizawa et al. |
| 5,598,263 | A | 1/1997 | Safa |
| D389,848 | S | 1/1998 | James |
| 5,757,501 | A | 5/1998 | Hipp |
| D395,285 | S | 6/1998 | Allon |
| 5,805,275 | A | 9/1998 | Taylor |
| 5,938,710 | A | 8/1999 | Lanza et al. |
| D416,032 | S | 11/1999 | Bakshi |
| D426,250 | S | 6/2000 | Lefkowitz |
| 6,141,105 | A | 10/2000 | Yahashi et al. |
| 6,252,659 | B1 | 6/2001 | Norita et al. |
| D445,818 | S | 7/2001 | Tucakov |
| 6,317,202 | B1 * | 11/2001 | Hosokawa ............ G01S 17/931 356/141.1 |
| 6,363,326 | B1 * | 3/2002 | Scully ................... G01S 13/931 701/301 |
| 6,392,688 | B1 | 5/2002 | Barman et al. |
| 6,429,941 | B1 | 8/2002 | Bamon et al. |
| D508,064 | S | 8/2005 | Ramirez |
| 6,985,212 | B2 | 1/2006 | Jamieson et al. |
| D524,834 | S | 7/2006 | Dozier et al. |
| D529,528 | S | 10/2006 | Ross, Jr. et al. |
| D541,798 | S | 5/2007 | Ichida et al. |
| 7,218,385 | B2 | 5/2007 | Takagi |
| 7,277,118 | B2 | 10/2007 | Foote |
| 7,322,833 | B1 | 1/2008 | Hakansson et al. |
| 7,446,766 | B2 | 11/2008 | Moravec |
| 7,583,391 | B2 | 9/2009 | Lu |
| D602,931 | S | 10/2009 | Kraner et al. |
| D613,341 | S | 4/2010 | Mar et al. |
| D627,814 | S | 11/2010 | Tzeng et al. |
| 7,947,944 | B2 | 5/2011 | Talbot |
| D642,607 | S | 8/2011 | Bergstrom et al. |
| 8,081,207 | B2 | 12/2011 | Barman et al. |
| 8,120,645 | B2 | 2/2012 | Katahira et al. |
| 8,169,596 | B2 | 5/2012 | Weiss et al. |
| 8,253,777 | B2 | 8/2012 | Lin |
| 8,274,550 | B2 | 9/2012 | Steuart, III |
| 8,279,266 | B2 | 10/2012 | Theobald |
| 8,290,245 | B2 | 10/2012 | Turbell et al. |
| 8,405,820 | B2 | 3/2013 | Oouchida |
| D680,142 | S | 4/2013 | Weiss |
| 8,427,472 | B2 | 4/2013 | Moravec |
| 8,439,266 | B2 | 5/2013 | Kawashima et al. |
| D697,198 | S | 1/2014 | Amirouche et al. |
| 9,310,608 | B2 * | 4/2016 | Weiss ...................... G05D 1/021 |
| 9,910,137 | B2 | 3/2018 | Weiss et al. |
| 2003/0116697 | A1 | 6/2003 | Kuhar |
| 2004/0049344 | A1 | 3/2004 | Simon et al. |
| 2004/0073359 | A1 | 4/2004 | Ichijo et al. |
| 2004/0246333 | A1 | 12/2004 | Steuart, III |
| 2005/0030392 | A1 | 2/2005 | Lee et al. |
| 2005/0278098 | A1 | 12/2005 | Breed |
| 2006/0012673 | A1 | 1/2006 | Koselka et al. |
| 2006/0013580 | A1 | 1/2006 | Horiguchi |
| 2006/0072020 | A1 | 4/2006 | McCutchen |
| 2006/0104800 | A1 | 5/2006 | Armbruster |
| 2006/0132644 | A1 | 7/2006 | Shangguan et al. |
| 2007/0013779 | A1 | 1/2007 | Gin et al. |
| 2007/0177011 | A1 | 8/2007 | Lewin et al. |
| 2007/0181786 | A1 | 8/2007 | Doemens et al. |
| 2008/0001727 | A1 | 1/2008 | Ohsumi et al. |
| 2008/0084474 | A1 | 4/2008 | Bergstrom et al. |
| 2008/0167819 | A1 | 7/2008 | Breed |
| 2008/0204570 | A1 | 8/2008 | Schultz et al. |
| 2009/0073308 | A1 | 3/2009 | Bleau et al. |
| 2009/0184811 | A1 | 7/2009 | Althoff |
| 2009/0295053 | A1 | 12/2009 | Farlow et al. |
| 2010/0165134 | A1 | 7/2010 | Dowski, Jr. et al. |
| 2010/0165155 | A1 | 7/2010 | Chang |
| 2011/0037963 | A1 | 2/2011 | Weiss et al. |
| 2011/0256800 | A1 | 10/2011 | Jennings et al. |
| 2012/0044353 | A1 | 2/2012 | Chiang |
| 2012/0065762 | A1 | 3/2012 | Pillarisetti |
| 2012/0075093 | A1 | 3/2012 | Cheng |
| 2012/0154521 | A1 | 6/2012 | Townsend et al. |
| 2012/0218538 | A1 | 8/2012 | Weiss et al. |
| 2012/0224844 | A1 | 9/2012 | Chen et al. |
| 2012/0242785 | A1 | 9/2012 | Sasagawa et al. |
| 2013/0044108 | A1 | 2/2013 | Tanaka et al. |
| 2013/0107011 | A1 | 5/2013 | Kim et al. |
| 2013/0257607 | A1 | 10/2013 | Rigby et al. |
| 2015/0362921 | A1 | 12/2015 | Hanaoka et al. |
| 2016/0223655 | A1 | 8/2016 | Weiss et al. |

FOREIGN PATENT DOCUMENTS

| | | |
|---|---|---|
| EP | 2467280 | 6/2012 |
| GB | 2383310 | 6/2003 |
| WO | 2013102212 | 7/2013 |

OTHER PUBLICATIONS

International Search Report and Written Opinion dated Jan. 21, 2015 issued in related International Application No. PCT/US2014/61576.

International Search Report and Written Opinion dated May 14, 2013 issued in related International Application No. PCT/US2012/072317.

European Registered Community Design No. 001981242-0001, filed Jan. 26, 2012, Weiss, Mitchell, "Multi-Head Camera," Seegrid Corporation, OHIM—Office For Harmonization In The Internal Market.

Howard, Courtney, "Flexible & integrated unmanned command & control", 2013 [retrieved on May 24, 2014]. Retrieved from the Internet: URL: http://www.militaryaerospace.com/articles/print/volume-24/issue-11/special-report/flexible-integrated-unmanned-command-control.html>.

Extended European Search Report dated Oct. 12, 2012, issued in related European Application No. 10810425.8.

International Search Report dated Apr. 27, 2011 issued in related International Application No. PCT/US2010/045451.

Juberts, Maris, et al., "Status reporton next generation LADAR for driving unmanned ground vehicles," NIST, Mobile Robots XVII, 2004, pp. 1-12, SPIE vol. 5609, Bellingham, WA.

Canadian Office Action dated Sep. 12, 2016 issued in corresponding Canadian Application No. 2807721.

* cited by examiner

MULTI-AXES SCANNING SYSTEM FROM SINGLE-AXIS SCANNER

CROSS REFERENCE TO RELATED APPLICATIONS

The present application claims the benefit under 35 USC 119(e) of U.S. Provisional Patent Application 62/582,760 filed Nov. 7, 2017, entitled MULTI-AXIS SCANNING SYSTEM FROM SINGLE AXIS LIDAR FOR VEHICLES, the contents of which is hereby incorporated by reference in its entirety.

TECHNICAL FIELD

The present description relates generally to detecting obstacles using scanning systems, and more particularly, but not exclusively, detecting obstacles using laser scanning systems of autonomous or semi-autonomous vehicles.

BACKGROUND

It is known in the art to detect obstacles using laser ranging. Laser range finders use light detection and ranging (LIDAR) to measure a distance to a target. Single-axis laser range finders project a laser beam in one scan direction. Some single-axis laser range finders can be configured to rotate the single-axis laser beam, creating an angular scanning plane. These single-axis scanners are often attached to autonomous or semi-autonomous vehicles to detect obstacles so these vehicles can navigate safely in the environment in which they operate. A scanner is often preferred because it can provide an angular detection range of up to 360 degrees.

SUMMARY

According to some aspects of the subject technology, a multi-axes scanning system is provided. The system includes a single-axis scanner and at least one reflector. The scanner includes an emitter that is capable of projecting a single-axis signal. The scanner is also capable of rotating the single-axis signal within a single annular plane to create a main scanning plane. The at least one reflector is arranged to receive and reflect a portion of the scan signal to create one or more secondary scanning planes, different from the main scanning plane. Thus, plural scanning axes are achieved from a single-axis scanner.

The scanner can be a single-axis laser range finder, e.g., a LIDAR scanner. The scanner can also be configured to rotate a signal generating emitter about a rotation axis and within an annular plane, with an angular range of up to 360 degrees.

The at least one reflector can be configured to reflect at least a portion of the scan signal from the emitter at a downward angle.

The at least one reflector can be configured to reflect at least a portion of the scan signal from the emitter in a travel direction.

The at least one reflector can be configured to reflect at least a portion of the scan signal from the emitter to form at least one secondary scanning plane above or beneath the main scanning plane.

The at least one reflector can have at least one flat surface, contours, or combinations thereof. The system may use a single reflector or a plurality of reflectors.

In accordance with aspects of the inventive concepts, provided is a multi-axes scanning system. The system includes a housing, a single-axis scanner, and at least one reflector. The scanner and the at least one reflector can be maintained and/or secured in the housing in a fixed orientation. The scanner is capable of projecting a single-axis scan signal that is rotated within an annular plane. The at least one reflector is oriented with respect to the scanner to receive and reflect a portion of the scan signal into multiple directions, thus adding multiple scanning axes.

In various embodiments, the system forms a main scanning plane coplanar with the annular plane.

In various embodiments, the at least one reflector forms at least one secondary scanning plane that is not coplanar with the annular plane.

In various embodiments, the single-axis scanner can be a single-axis scan laser range finder.

In various embodiments, the scanner can be configured to rotate the single-axis scan signal within an annular plane, with an angular scan range of up to 360 degrees.

In various embodiments, the scanner can be configured to rotate the single-axis scan signal within an annular plane, with an angular scan range of up to 270 degrees.

In various embodiments, the at least one reflector can be configured to reflect at least a portion of the scan signal at a downward angle.

In various embodiments, the at least one reflector can be or include at least one mirror.

In various embodiments, the at least one reflector or mirror can include at least one flat surface and/or at least one contoured surface.

In various embodiments, the at least one reflector can be or include a plurality of mirrors.

In various embodiments, the housing includes a lateral opening or window configured to enable the main scanning plane to pass through the housing.

In various embodiments, the housing includes one or more openings or windows configured to enable the at least one secondary scanning plane to pass through the housing.

In various embodiments, the at least one secondary scanning plane passes through the housing beneath the main scanning plane.

In accordance with another aspect of the inventive concepts, provided is a vehicle having a multi-axes scanning system. The scanning system includes a housing, a single-axis scanner, and at least one reflector. The scanner and the at least one reflector can be secured and/or maintained in the housing in a fixed orientation. The scanner is capable of projecting a single-axis scan signal and rotating the single-axis signal within an annular plane. The at least one reflector is oriented to receive and reflect a portion of the scan signal into multiple directions, thus adding multiple scanning axes.

In various embodiments, the vehicle can be autonomous or semi-autonomous.

In various embodiments, the housing is mounted to the front of the vehicle.

In various embodiments, the vehicle can be a two-wheeled vehicle.

In various embodiments, the system forms a main scanning plane coplanar with the single annular plane.

In various embodiments, the at least one reflector forms at least one secondary scanning plane that is not coplanar with the main scanning plane.

In various embodiments, the housing includes a lateral opening or window configured to enable the main scanning plane to pass through the housing.

In various embodiments, the housing includes one or more openings or windows configured to enable the at least one secondary scanning plane to pass through the housing.

In various embodiments, the at least one secondary scanning plane passes through the housing beneath the main scanning plane.

In various embodiments, the scanner can be a single-axis scan laser range finder.

In various embodiments, the scanner can also be configured to rotate the single-axis scan signal within annular plane with an angular range of up to 360 degrees.

In various embodiments, the at least one reflector can be configured to reflect at least a portion of the rotating single-axis scan signal at a downward angle.

In various embodiments, the at least one reflector can include at least one flat surface, contoured surface, or combinations thereof.

In various embodiments, the system may include a plurality of reflectors and/or mirrors.

In various embodiments, the at least one reflector and/or mirror is configured to reflect a portion of the received scanning plane at a downward angle such that the scanning plane scans the surface on which the vehicle is moving at a distance of 0 to 30 cm from a front of the vehicle.

BRIEF DESCRIPTION OF THE DRAWINGS

The accompanying drawings, which are included to provide further understanding and are incorporated in and constitute a part of this specification, illustrate disclosed aspects and together with the description serve to explain the principles of the disclosed aspects.

The following figures are included to illustrate certain aspects of the present disclosure, and should not be viewed as exclusive implementations. The subject matter disclosed is capable of considerable modifications, alterations, combinations and equivalents in form and function, without departing from the scope of this disclosure.

DETAILED DESCRIPTION

Various aspects of the inventive concepts will be described more fully hereinafter with reference to the accompanying drawings, in which some exemplary embodiments are shown. The inventive concepts may, however, be embodied in many different forms and should not be construed as limited to the exemplary embodiments set forth herein.

It will be understood that, although the terms first, second, etc. may be used herein to describe various elements, these elements should not be limited by these terms. These terms are used to distinguish one element from another, but not to imply a required sequence of elements. For example, a first element can be termed a second element, and, similarly, a second element can be termed a first element, without departing from the scope of the present invention. As used herein, the term "and/or" includes any and all combinations of one or more of the associated listed items. The term "or" is not used in an exclusive or sense, but in an inclusive or sense.

It will be understood that when an element is referred to as being "on" or "connected" or "coupled" to another element, it can be directly on or connected or coupled to the other element or intervening elements can be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, steps, operations, elements, and/or components, but do not preclude the presence or addition of one or more other features, steps, operations, elements, components, and/or groups thereof.

To the extent that functional features, operations, and/or steps are described herein, or otherwise understood to be included within various embodiments of the inventive concept, such functional features, operations, and/or steps can be embodied in functional blocks, units, modules, operations and/or methods. And to the extent that such functional blocks, units, modules, operations and/or methods include computer program code, such computer program code can be stored in a computer readable medium, e.g., such as non-transitory memory and media, that is executable by at least one computer processor.

Autonomous and/or semi-autonomous vehicles often use scanners to gather information about the environment in which they navigate so they can safely move around and operate within the environment. Typically, when an autonomous or semi-autonomous vehicle is equipped with a single-axis scanner, the scanner only projects parallel to the surface on which the vehicle is moving, e.g., a ground surface. Consequently, the scanner has difficulties detecting changes in the surface, such as slope angles, steps, cliffs, and pot-holes. The scanner also often fails to detect obstacles on the surface in the immediate vicinity of the vehicle.

To address this problem, some autonomous and/or semi-autonomous vehicles may be equipped with multiple single-axis scanners to add multiple planes of detection. However, this can greatly increase the cost of production and limit design options. Multi-axes laser range finders can also be used; however, these tend to be very expensive and not feasible for commercial purposes. Point cloud sensors and stereo cameras can offer an effective method for identifying obstacles, such as cliffs, potholes, and changes in surface slope, but these sensors also have difficulties in detecting obstacles in close proximity to the vehicle. Thus, a scanning system that uses a single-axis laser scanner for scanning across multiple axes would be beneficial and cost-effective.

Figure 1:
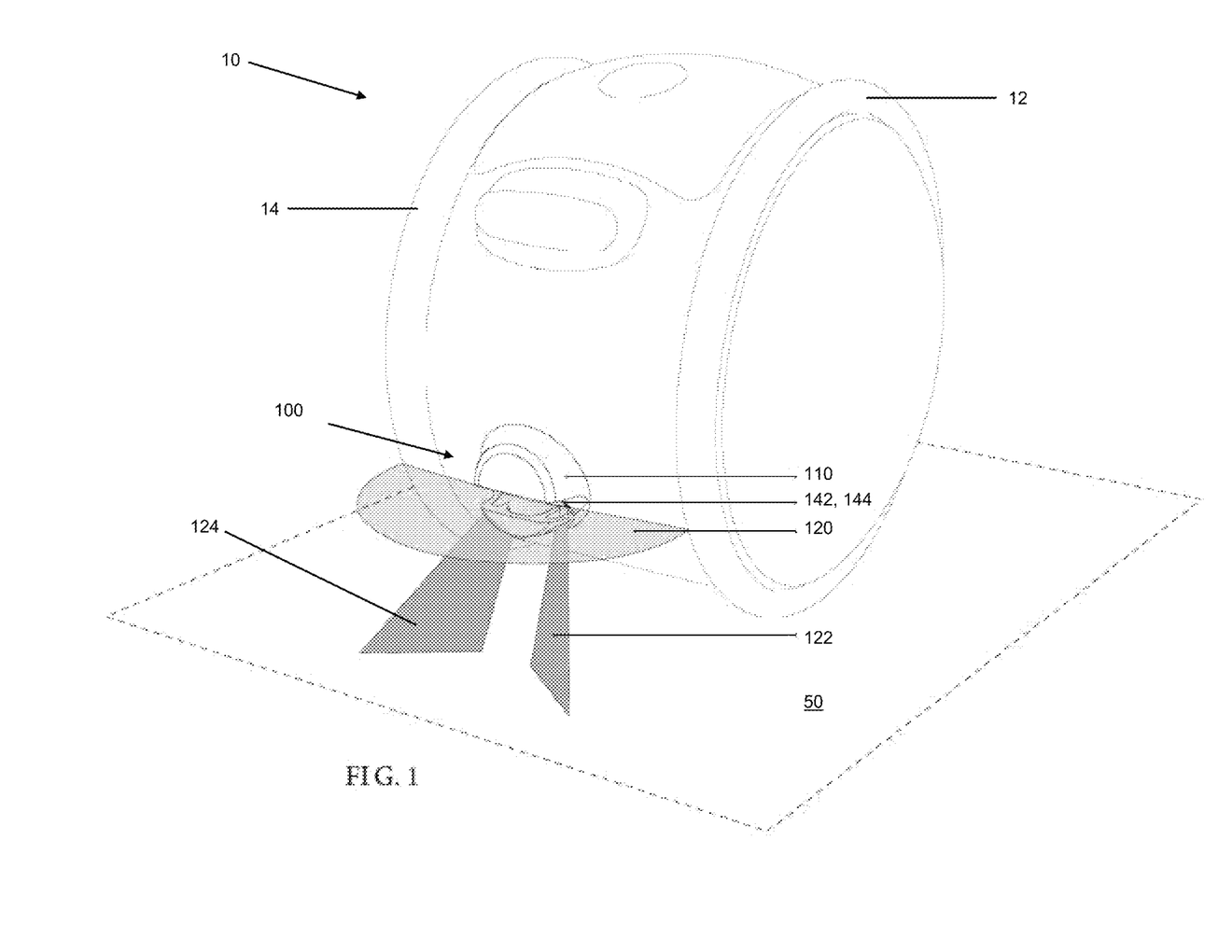
FIG. 1 is a perspective view of an embodiment of a vehicle including a multi-axes scanning system, according to aspects of the inventive concepts.
Figure 2:
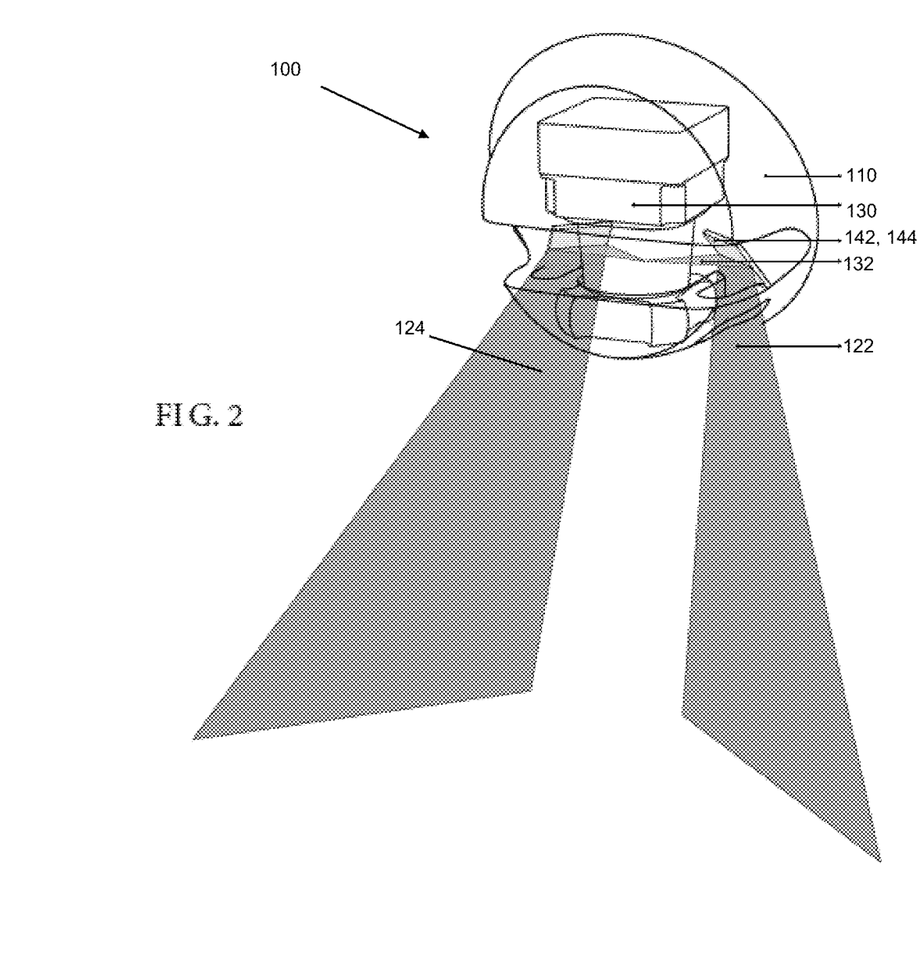
FIG. 2 is a detailed diagram of an embodiment of a multi-axes scanning system of FIG. 1, according to aspects of the inventive concepts.
Figure 3:
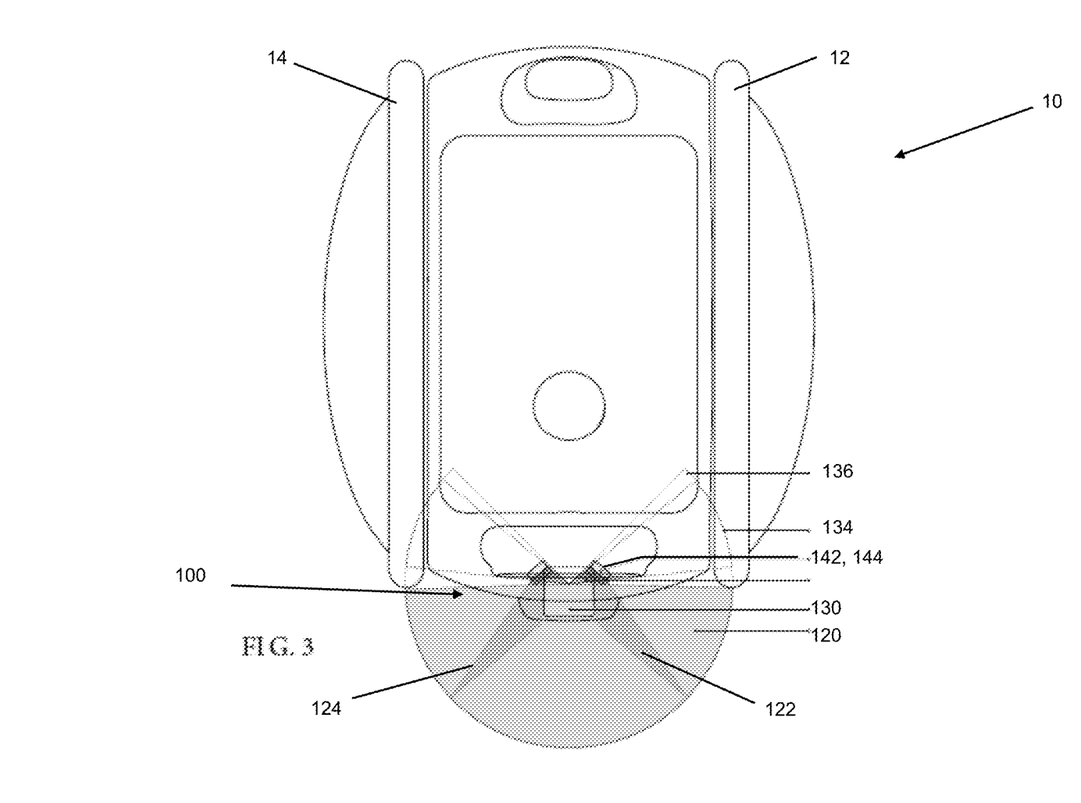
FIG. 3 is a top view perspective view of the vehicle including the multi-axes scanning system of FIG. 1, according to aspects of the inventive concepts.
Figure 4:
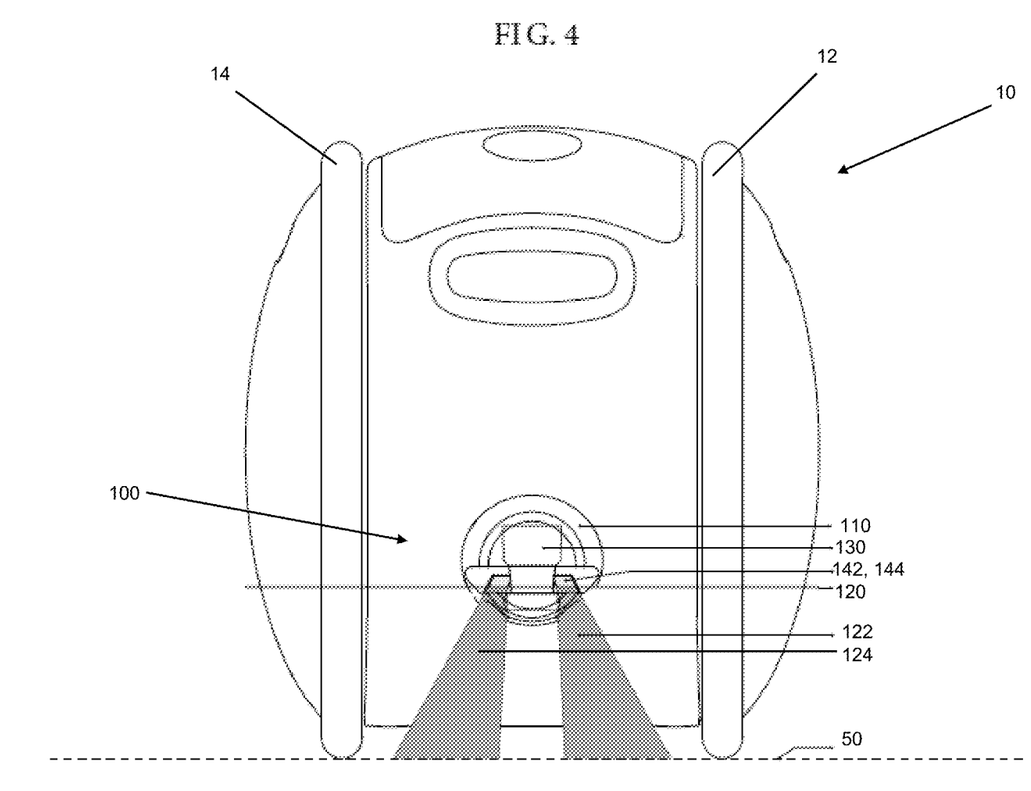
FIG. 4 is a front view perspective view of the vehicle including the multi-axes scanning system of FIG. 1, according to aspects of the inventive concepts.
Figure 5:
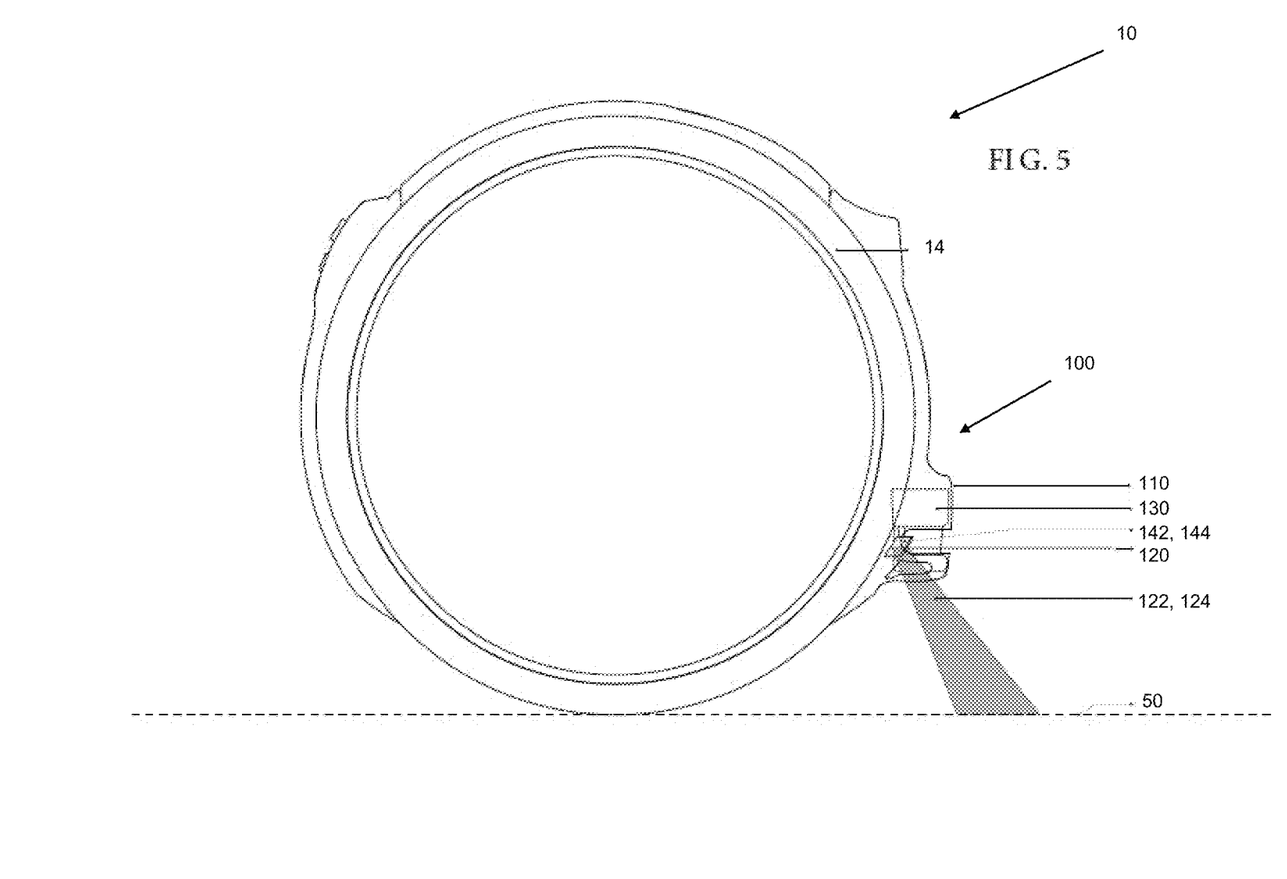
FIG. 5 is a side view perspective view of the vehicle including the multi-axes scanning system of FIG. 1, according to aspects of the inventive concepts.

As shown in FIG. 1, the present disclosure provides a vehicle 10 having a multi-axes scanning system 100, according to aspects of the inventive concepts. FIG. 2 is a detailed diagram of an embodiment of a multi-axes scanning system 100 of FIG. 1, according to aspects of the inventive concepts. FIG. 3 is a top view perspective view of the vehicle including the multi-axes scanning system of FIG. 1. FIG. 4 is a front view perspective view of the vehicle including the multi-axes scanning system of FIG. 1. And FIG. 5 is a side view perspective view of the vehicle including the multi-axes scanning system of FIG. 1.

In various embodiments, the vehicle 10 can be an autonomous or semi-autonomous vehicle. The multi-axes scanning system 100 can be affixed to, disposed at, and/or integral with a front of the vehicle 10 and above a ground plane or ground surface 50, as is shown in FIGS. 1 and 3-5. In various embodiments, the scanning system 100 can be located at a height above the ground surface 50 and less than half of the height of the vehicle 10.

In this embodiment, the vehicle 10 has a generally spherical or disc shape and includes a right wheel 12 and a left wheel 14 and the multi-axes scanning system 10 is disposed between the right and left wheels 12, 14. In various embodiments, the vehicle 10 can be, as an example, a mobile carrier vehicle.

The multi-axes scanning system 100 is configured to provide multiple scanning planes from a single scanning beam, which can be output by an emitter of a scanner 130. The multiple scanning planes can include a first, main scanning plane 120 and one or more secondary scanning planes 122, 124, which can be angular scanning planes. In various embodiments, the main scanning plane 120 extends in a travel direction and the one or more secondary angular scanning planes 122, 124 also extend in the travel direction, but at an angle and at least partially beneath the first angular plane 120. Such an embodiment is shown in FIGS. 1 and 3-5.

The multi-axes scanning system 100 can include a housing 110 surrounding beam-forming and/or output elements of the multi-axes scanning system 100, e.g., an emitter and receiver and/or detector. In various embodiments, the multi-axes scanning system 100 can include a single-axis scanner 130, which can be oriented within housing 110. The single-axis scanner 130 can be a scanner that rotates a scanning beam, e.g., a laser beam, about a rotation axis and in a scanning plane that is orthogonal to the rotation axis. The scanning plane can be an annular scanning plane. In various embodiments, the scanning system 100 can include one or more reflectors (e.g., one or more mirrors) 142, 144 and the housing 110 that maintains the one or more reflectors in a fixed orientation with respect to the rotating scanning beam 130.

In the embodiments shown, reflectors (or mirrors) 142, 144 reflect the scan signal to produce the secondary scanning planes 122, 124, which can be angular scanning planes. In various embodiments, the housing 110 includes a lateral opening or window configured to enable the main scanning plane 120 to pass through the housing 110. The housing 110 can also include openings or windows for passage of the reflected scanning planes from the mirrors 142, 144 through the housing 110. The one or more openings or windows enable the at least one secondary scanning plane 122, 124 to pass through the housing 110. In this embodiment, the secondary scanning planes are reflected through in the travel direction and toward the ground surface 50. In various embodiments, the at least one secondary scanning plane 122, 124 passes through the housing 100 beneath the main scanning plane 120, and in the travel direction.

The scanner 130 can be a single-axis laser range finder capable of rotating a single-axis scan signal or beam within a single annular plane—the main annular plane. In some embodiments, the scanner 130 can be a LIDAR laser scanner, as an example. The scanner 130 can be configured to rotate the single-axis scan signal within the main annular plane within a range of scan angles. In various embodiments, the range of scan angles can result in an angular scan range of at least 270 degrees to 360 degrees. In other embodiments, the angular scan range can be between about 180 degrees and about 360 degrees. In still other embodiments, the angular scan range can be between about 90 degrees and 360 degrees. In still other embodiments, the angular scan range can be between 90 degrees and up to about 270 degrees.

The scanner 130 can be oriented so that the main annular scan plane 120 is substantially parallel to the ground surface 50. Thus, in various embodiments, the scanning system 100 is capable of projecting a single-axis scan signal or beam in a travel direction that is horizontal to the ground surface 50 and orthogonal to the axis of rotation of the scanning beam. The travel direction can be a forward direction or a backward direction depending on whether or not the vehicle 10 has a defined front and back.

In a preferred embodiment, the multi-axes scanning system 100 includes a plurality of reflectors (e.g., mirrors), including reflectors 142, 144 oriented rearward of the single-axis scanner or rearward of the axis of rotation of the single-axis scanner. In some implementations, the plurality of reflectors can either be or include one or more flat surfaces, contours, or a combination thereof. The reflectors 142, 144 can be maintained in a fixed position relative to the scanner 130 within housing 110. The plurality of reflectors 142, 144 is oriented to receive one or more portions of the rotating scan signal and reflect the received portions in one or more downward directions towards the ground surface 50 on which the vehicle 10 is moving to form one or more secondary scanning planes 122, 124. The secondary scanning planes can be angular scanning planes. The reflectors 142, 144 can be oriented to form the secondary scanning planes 122, 124 beneath the main angular scanning plane 120, and angled in the travel direction toward the ground surface 50. In various embodiments, the plurality of reflectors are arranged to reflect the portions of the scan signal at a downward angle such that the secondary scanning planes scan the ground surface 50 at a distance of 0 to 30 cm from a front of the vehicle 10.

Figure 6:
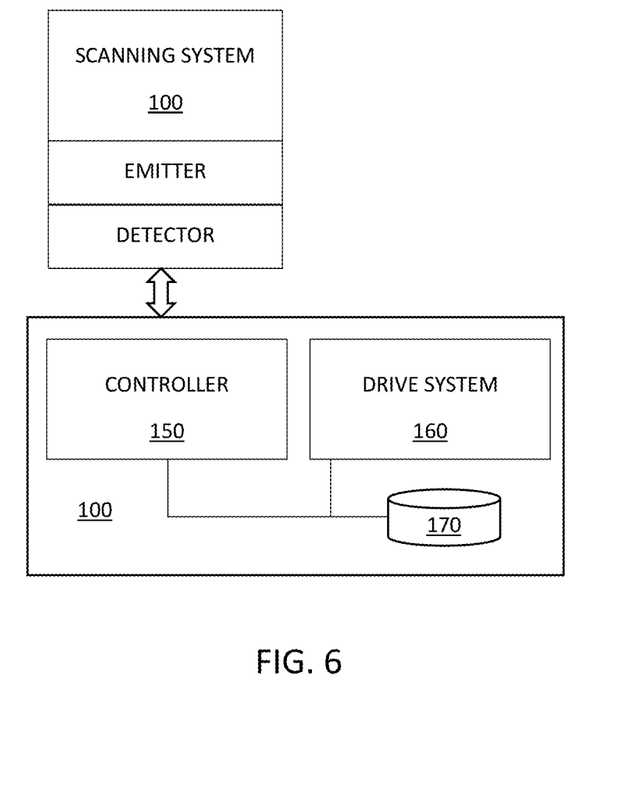
FIG. 6 provides an embodiment of control elements configured to control the vehicle in response to multi-axes scanning system information, according to aspects of the inventive concepts.

FIG. 6 provides an embodiment of control elements configured to control the vehicle in response to multi-axes scanning system information, according to aspects of the inventive concepts. Referring to FIG. 6, the scanning system 100 includes a receiver and or detector that receives reflections of the output scan signal or beam. From the received signals, distance information can be determined. During operation, the autonomous or semi-autonomous vehicle 10 uses the information from the scanning system 100 to detect changes in the terrain, such as cliffs, curbs, stairs, objects, obstacles, or a pitch of the surface 50. A controller 150 of the vehicle receives information from the scanning system 100, in the form of detection signals, and uses information in the detection signals to control a movement of the vehicle 10 through a drive system 160. As examples, using information from the detection signals, the control can communicate with the drive system to cause the vehicle to accelerate, decelerate, pause, stop, turn, and/or change directions. Information from the scanner and/or vehicle can be stored in one or more storage devices 170. Such controlled vehicle movement can include acceleration, deceleration, and/or turning.

The controller 150 uses the scanning system 100 to first detect a distance to the surface 50. The controller 150 uses the total distance measured by the scanner system 100, the known distance between the scanner 130 and mirrors 142, 144, and the mirrors' known angles of occurrence to determine a distance from the vehicle 10 to where the secondary scanning planes 122, 124 impinge on the scanned ground surface 50. The scanning system 100 scans the ground surface 50 multiple times, and a low pass filter is used to filter noise from the multiple received signals or reflections. After the noise is filtered from the received signals, the controller determines an average distance to the scanned portion of the ground surface 50.

The controller 150 can be configured to continuously determine an average distance to a scanned portion of the ground surface 50 as the vehicle 10 moves across the ground surface 50. The controller 150 can be configured to compare the determined average distances with upper and lower range thresholds. Once a change in the determined average distance exceeds an upper or lower threshold, the controller 150 concludes that the scanning system 100 has detected a change in the environment, such as a cliff, curb, stair, pothole, or change in the pitch of the surface.

As an illustrative example, a lower threshold of −5 cm may be used. Thus, if the determined average distance changes by −5 cm or more (in magnitude), the change exceeds a lower threshold and the controller concludes that the scanner 130 has detected a drop-off in the surface. On the other hand, if the upper threshold is +5 cm, and the determined average distance changes by +5 cm or more, the controller concludes that the scanner has detected a raise in elevation of the surface, e.g., a curb. Once these changes are detected, the controller controls the movement of the vehicle 10 accordingly.

In some embodiments, the vehicle 10 can use an Inertial Measurement Unit along with the scanning system 100 to help determine upper thresholds, lower thresholds, and tilt relative to the road or ground surface 50. The information detected by the scanning system 100 can be communicated to the controller 150 and for controlling the drive system, and can also be used for continuously building a three-dimensional map of the environment, instantaneous object detection, or a combination thereof.

As shown in FIG. 2, the multi-axes scanning system 100 can comprise a housing 110, single-axis scanner 130, and a plurality of reflectors 142, 144. The housing 110 can be configured to encompass the scanner 130 and reflectors. The scanning system 100 is capable of projecting a single-axis scan signal. The scanner 130 is also capable of rotating the single-axis scan signal along a single annular plane, the main annular plane. In some embodiments, the scanner can be configured to rotate the single-axis scan signal within the annular plane with an angular scan range of at least 270 degrees, and optionally up to 360 degrees. The plurality of reflectors 142, 144 can be oriented within the housing 100 rearward of the single-axis scanner 130, or its axis of rotation. The plurality of reflectors 142, 144 can be oriented to receive and reflect a portion of the rotating scan signal. In a preferred embodiment, the plurality of reflectors 142, 144 are angled downward to reflect the received scan signal from the scanner 130 towards the ground surface 50 on which the vehicle 10 is moving. In some embodiments, the plurality of reflectors 142, 144 can either be flat surfaced, contoured, or a combination thereof. In further embodiments, the plurality of mirrors 142, 144 can be oriented to reflect the received scan signal to scan the ground surface 50 at a distance of 0 to 30 cm from a front of the vehicle 10.

FIG. 3 provides a top view of a multi-axes scanning system 100 fixed to a vehicle 10, similar to FIG. 1. In this embodiment, the vehicle 10 has a generally spherical or disc shape and includes two wheels 12, 14. The vehicle 10 can be an autonomous or semi-autonomous vehicle. The multi-axes scanning system 100 is fixed to or located at a front portion of the vehicle 10. The multi-axes scanning system 100 includes a housing 110, a single-axis scanner 130, and a plurality of reflectors (e.g., mirrors) 142, 144. The scanning system 100 is capable of projecting a single-axis scan signal in multiple planes, including multiple forward projecting planes. The scanner 130 is capable of rotating the single-axis scan signal in a single, main annular plane to form a main scanning plane. The scanner is configured to rotate the single-axis scan signal within the main annular plane with an angular range of at least 270 degrees, in some embodiments.

In various embodiments, the single-axis laser scanner 130 rotates horizontally, creating a horizontal annular scanning plane. In a preferred embodiment, the scanning range of the scanner can be at least 270 degrees, or ±135 degrees from a center point of the vehicle 10 in the travel direction. The full range of the scan 136 is shown in FIG. 3. However, in the present embodiments, the vehicle's right and left wheels 12, 14 are located right and left of the scanning system 100 at angles of −90 degrees and +90 degrees, respectively, from the center point of the vehicle 10. Therefore, due to the location of the scanner 130 relative to the vehicle wheels 12, 14, the scanner 130 is only capable of effectively using 0 degrees to ±90 degrees of the angular scan range. Consequently, at least ±45 degrees of the annular scanning plane 136 is "wasted" in that the scanner signal or beam 132 (see FIG. 2) cannot not effectively scan for object detection in those scan areas because the scan signal or beam 132 is directed toward the vehicle body. Therefore, the wasted portions of the scan can be considered over-scan portions. The reflectors 142, 144 are oriented to intercept the over-scan portions 134 to make use of it in generating the secondary scanning planes 122, 124.

Therefore, some of the present embodiments are designed to make efficient use of the overs-scan portions 134 of the scanning plane 136. This is accomplished by positioning reflectors rearward of the scanner 130 (or at least rearward of the axis of rotation of the scanner 130) to reflect segments 134 of the "wasted" scanning portion to create at least one additional scanning plane, as at least one secondary scanning plane. Accordingly, the scanner 130 can detect more information about the vehicle's surrounding environment, particularly with regards to the ground surface 50 immediately in front of the vehicle 10. Thus, the scanning system 100 creates a cost-effective method for increased obstacle detection without the need to use expensive multi-axes scanners or multiple single-axis scanners on a vehicle.

For example, referring back to FIG. 3, the scanning system 130 projects an annular scan having an angular range of at least ±135 degrees from the front of the vehicle. Two reflectors 142, 144 are disposed and maintained behind the scanner 130 and configured to reflect a received signal 134 at a downward and forward angle. The reflectors 142, 144 are placed such that they receive and reflect portions of the scan ranges 134 that comprises the "wasted" scanning portion. As an example, in some embodiments, the reflected segment can be portions of the angular scan at angles between ±100 degrees to ±120 degrees from a center point at the front of the vehicle. Other angles can be used in other embodiments. The reflectors 142, 144 reflect the received portion of the scanning plane at a downward and forward angle, creating at least one additional (secondary) scanning plane. Thus, the multi-axes scanning system 100 reduces the need for multiple scanners by making efficient use of the previously wasted scanning portions to create at least one additional scanning plane and axis.

While the foregoing has described what are considered to be the best mode and/or other preferred embodiments, it is understood that various modifications can be made therein and that the invention or inventions may be implemented in various forms and embodiments, and that they may be applied in numerous applications, only some of which have been described herein. It is intended by the following claims to claim that which is literally described and all equivalents thereto, including all modifications and variations that fall within the scope of each claim.

It is appreciated that certain features of the inventive concepts, which are, for clarity, described in the context of separate embodiments, may also be provide in combination in a single embodiment. Conversely, various features of the invention which are, for brevity, described in the context of a single embodiment may also be provided separately or in any suitable sub-combination.

For example, it will be appreciated that all of the features set out in any of the claims (whether independent or dependent) can combined in any given way.

What we claim is:

1. A multi-axes scanning system, comprising:
   a scanner configured to project a scan signal to form a horizontal main scanning plane in a first direction and substantially parallel to a ground surface, the scanner being configured to detect a detection signal;
   at least one fixed-orientation reflector arranged to receive a portion of the scan signal, the at least one fixed-orientation reflector being arranged to form at least one secondary scanning plane directed downwardly in the first direction toward the ground surface and at an angle relative to the main scanning plane; and
   a housing that defines at least one window or opening configured to enable passage of the at least one secondary scanning plane through the housing,
   wherein the housing defines a lateral opening or window, separate from the at least one window or opening, configured to enable the main scanning plane to pass through the housing.

2. The system of claim 1, wherein the scanner is a laser range scanner.

3. The system of claim 1, wherein the at least one secondary scanning plane is angled downward beneath the main scanning plane.

4. The system of claim 1, wherein the at least one secondary scanning plane is a plurality of secondary scanning planes angled downward beneath the main scanning plane.

5. The system of claim 1, wherein the portion of the scan signal is less than 50% of an angular range of the scan signal.

6. The system of claim 1, wherein at least 50% of the scan signal is projected to form the main plane.

7. The system of claim 1, wherein the scanner and the at least one fixed-orientation reflector are secured to the housing in a fixed orientation.

8. The system of claim 1, wherein the at least one secondary scanning plane is arranged to scan the ground surface at a distance of 0 to 30 cm.

9. The system of claim 1, wherein the scanner is configured to continuously determine an average distance between the at least one fixed-orientation reflector and the ground surface, and whether the average distance is within predetermined upper and lower limits.

10. The system of claim 1, wherein at least one of the at least one fixed-orientation reflector includes a contoured surface.

11. The system of claim 1, wherein the at least one fixed-orientation reflector comprises a plurality of fixed-orientation reflectors having a flat surface arranged to receive a different portion of the scan signal.

12. A multi-axes scanning system, comprising:
    a scanner configured to project a scan signal within a first angular scanning plane to form a main scanning plane in a first direction and substantially parallel to a ground surface, the scanner being configured to detect a detection signal;
    a plurality of fixed-orientation reflectors arranged to receive different portions of the scan signal to form a plurality of secondary scanning planes downwardly directed in the first direction toward the ground surface and beneath the main scanning plane and at an angle relative to the main scanning plane; and
    a housing within which is maintained the scanner and the plurality of fixed-orientation reflectors wherein the housing defines at least one window or opening configured to enable passage of the plurality of secondary scanning planes through the housing,
    wherein the housing defines a lateral opening or window, separate from the at least one window or opening, configured to enable the main scanning plane to pass through the housing.

13. The system of claim 12, wherein the scanner is a laser range scanner.

14. The system of claim 12, wherein the different portions of the scan signal are less than 50% of an angular range of the scan signal and at least 50% of the scan signal is projected to form the main scanning plane.

15. The system of claim 12, wherein the scanner is configured to continuously determine an average distance between the at least one fixed-orientation reflector and the ground surface, and whether the average distance is within predetermined upper and lower limits.

16. The system of claim 12, wherein at least one of the plurality of fixed-orientation reflectors includes a contoured surface.

17. The system of claim 12, wherein at least one of the plurality of fixed-orientation reflectors includes a flat surface.

18. The system of claim 12, wherein the housing is coupled to a vehicle.

19. A vehicle, comprising:
    at least two wheels; and
    a multi-axes scanning system, comprising:
       a scanner configured to project a scan signal to form a horizontal main scanning plane in a travel direction substantially parallel to a ground surface, the scanner being configured to detect a detection signal;
       a plurality of fixed-orientation reflectors arranged to receive different portions of the scan signal, the plurality of fixed-orientation reflectors being arranged to form a plurality of secondary scanning planes directed downwardly in the travel direction toward the ground surface and beneath the main scanning plane and at an angle relative to the main scanning plane; and a housing within which is maintained the scanner and the plurality of fixed-orientation reflectors wherein the housing defines at least one window or opening configured to enable passage of the plurality of secondary scanning planes through the housing, wherein the housing defines a lateral opening or window, separate from the at least one window or opening, configured to enable the main scanning plane to pass through the housing.

20. The vehicle of claim 19, further comprising:

a vehicle drive system coupled to the at least two wheels; and a controller coupled to the vehicle drive system and the multi-axes scanning system, the controller configured to control the vehicle drive system in response to detection signals from the multi-axes scanning system.

21. The vehicle of claim 20, wherein the controller is configured to signal the vehicle drive system to accelerate, decelerate, pause, stop, turn and/or change directions in response to the detection signals.

22. A multi-axes scanning system, comprising:

a scanner configured to project a scan signal to form a horizontal main scanning plane in a first direction and substantially parallel to a ground surface, the scanner being configured to detect a detection signal;

at least one fixed-orientation reflector arranged to receive a portion of the scan signal, the at least one fixed-orientation reflector being arranged to form at least one secondary scanning plane directed downwardly in the first direction toward the ground surface and at an angle relative to the main scanning plane, wherein the at least one secondary scanning plane is arranged to scan the ground surface at a distance of 0 to 30 cm.

* * * * *